United States Patent
Kiesenbauer

(10) Patent No.: US 10,077,831 B2
(45) Date of Patent: Sep. 18, 2018

(54) COMPONENT FOR A PLANETARY GEAR TRAIN

(71) Applicant: SIEMENS AKTIENGESELLSCHAFT, München (DE)

(72) Inventor: Jens Kiesenbauer, Penig (DE)

(*) Notice: Subject to any disclaimer, the term of this patent is extended or adjusted under 35 U.S.C. 154(b) by 706 days.

(21) Appl. No.: 14/395,268

(22) PCT Filed: Apr. 16, 2013

(86) PCT No.: PCT/EP2013/057877
§ 371 (c)(1),
(2) Date: Oct. 17, 2014

(87) PCT Pub. No.: WO2013/156463
PCT Pub. Date: Oct. 24, 2013

(65) Prior Publication Data
US 2015/0065291 A1 Mar. 5, 2015

(30) Foreign Application Priority Data
Apr. 20, 2012 (DE) .................... 20 2012 004 029 U

(51) Int. Cl.
*F16H 57/08* (2006.01)
(52) U.S. Cl.
CPC .................. *F16H 57/082* (2013.01)
(58) Field of Classification Search
None
See application file for complete search history.

(56) References Cited

U.S. PATENT DOCUMENTS

| | | | |
|---|---|---|---|
| 2,095,794 A | 7/1934 | Corbin | |
| 4,315,556 A | 2/1982 | Timoney | |
| 5,292,292 A | * 3/1994 | Heinrich et al. | |
| 2006/0275607 A1 | 12/2006 | Demir | |

FOREIGN PATENT DOCUMENTS

| | | |
|---|---|---|
| CN | 2830798 Y | 10/2006 |
| CN | 200986018 Y | 12/2007 |
| CN | 101218050 A | 7/2008 |
| DE | 102007010092 | 11/2007 |
| EP | 1186804 A1 | 3/2002 |

OTHER PUBLICATIONS

International Search Report issued by the European Patent Office in International Application PCT/EP2013/057877 dated Jun. 14, 2013.

* cited by examiner

*Primary Examiner* — Erin D Bishop
(74) *Attorney, Agent, or Firm* — Henry M. Feiereisen LLC

(57) ABSTRACT

A component for a planetary gear train, which is cast as one piece, includes a planetary carrier and a hollow-cast hollow shaft arranged in a coaxial manner on the planetary carrier. A chamber of the hollow shaft is accessible through an opening on at least one axial end of the hollow shaft. On an outer periphery thereof, the hollow shaft supports at least one connecting element suitable for forming a shaft-hub connection.

12 Claims, 8 Drawing Sheets

COMPONENT FOR A PLANETARY GEAR TRAIN

CROSS-REFERENCES TO RELATED APPLICATIONS

This application is the U.S. National Stage of International Application No. PCT/EP2013/057877, filed Apr. 16, 2013, which designated the United States and has been published as International Publication No. WO 2013/156463 and which claims the priority of German Patent Application, Ser. No. 20 2012 004 029.4, filed Apr. 20, 2012, pursuant to 35 U.S.C. 119(a)-(d).

BACKGROUND OF THE INVENTION

The present invention relates to a component for a planetary gear train, said component comprising a planetary carrier and a shaft, and to a planetary gear train.

In planetary gear trains, in particular for industrial applications, designs are known which have a solid shaft on the output side. In order to be able to connect this gear shaft non-rotatably e.g. to a work machine, it is customary to provide a keyway or gear teeth on the periphery of the shaft.

SUMMARY OF THE INVENTION

The object of the present invention is to provide an improved component for a planetary gear train, comprising a planetary carrier and a shaft. A further object of the present invention is to provide a planetary gear train having such a component.

According to one aspect of the invention, the object is achieved by a component which is cast as one piece, for a planetary gear train, with the component including a planetary carrier and a hollow-cast hollow shaft arranged in a coaxial manner on the planetary carrier, the chamber of the shaft being accessible through an opening on at least one axial end (6) of the hollow shaft, wherein the hollow shaft supports on its outer periphery at least one connecting element suitable for forming a shaft-hub connection.

According to another aspect of the invention, the object is achieved by a planetary gear train including a component as set forth above.

The component, which is cast as one piece, is provided for a planetary gear train. It comprises a planetary carrier and a hollow shaft arranged coaxially on the planetary carrier. The hollow shaft is hollow-cast. The chamber thereof is accessible through an opening which is arranged on at least one axial end of the hollow shaft. The hollow shaft supports on its outer periphery at least one connecting element which is suitable for forming a shaft-hub connection.

The component is fashioned such that the hollow shaft forms an axial end of the component. The hollow shaft can thus synonymously also be referred to as a hollow shaft journal.

In a conventional method of manufacturing a planetary carrier of an output stage from one piece with the solid shaft on the output side, this integral component is frequently cast. Here, the solid shaft is usually arranged in the casting mold so as to project upwards, because in this way a defined, directional solidification of the liquid metal can be achieved from the relatively thin-walled planetary carrier in the direction of the materially thick shaft end, from where the cast material enters. Due to the relatively large change in material thickness in the transitional area between a cheek of the planetary carrier and the solid shaft, accumulations of material can occur in the region of the solid shaft during casting which are conducive to casting defects such as porosities, shrinkage cavities and contamination.

In order to prevent such casting defects, the solid shaft has until now often been extended upwardly in the casting mold or high-volume feeders have been used. By this means, the casting defects occurring can be displaced into areas above the actual solid shaft, which, after solidification, can be removed by mechanical processing.

Controlled, low-defect solidification in the region of the rapid transition in material thickness between planetary carrier and solid shaft could until now often be achieved only through the large-scale use of casting and molding measures such as chill casting.

In the present invention by contrast, the gear shaft connected to the planetary carrier, said shaft being preferably fashioned as an output-side shaft journal, is furnished with a chamber open at the end, without providing facings, e.g. a keyway or gear teeth, on the enclosing surfaces of this chamber which could serve to form a connection with an external shaft. Rather than on the inside of the hollow shaft, such facings are fashioned on the outer periphery of the hollow shaft.

The invention is based on the recognition that, in a hollow design of the shaft, the wall thicknesses in the region of the shaft are substantially reduced compared with a solid shaft, and, consequently, a casting of the component, comprising a planetary carrier and a shaft, is possible with a shaft projecting downwardly in the casting mold, because in this way the cast cross-sections in the shaft are thinner than in the adjoining cheek of the planetary carrier. The idea on which the invention is based can thus be seen as consisting in providing a hollow shaft on the component without using the chamber of the hollow shaft to fashion a non-rotatable shaft-hub connection, e.g. by inserting an external second shaft into the chamber of the hollow shaft, and without leading or guiding media or supply lines through the chamber of the hollow shaft. This means that the chamber is provided primarily in order to improve the castability of the component.

The smaller wall thickness in the region of the shaft than in a solid shaft produces higher strength values of the cast material, therefore provides higher levels of mechanical reliability and consequently enables the transmission of higher forces and torques.

Also, the hollow design of the shaft saves casting material in the interior of the shaft, where it could in any case make only a very small contribution to load-bearing capacity. The saving on material results in a substantial reduction in cost and weight.

Compared with conventional shafts, in which, in order to reduce casting defects, additional material is accumulated on the shaft, the present invention yields a significant saving on material and a reduction in the mechanical processing required, e.g. removal of the additional material on the shaft, and consequently a cost advantage.

Casting with a downwardly directed shaft makes it possible to position feeders laterally on the cast part. This significantly reduces the overall height in the casting mold, e.g. in a casting box. Consequently, smaller molding machines or even automated casting, can be used, which again offers cost advantages.

Advantageous embodiments and further developments of the invention are specified in the dependent claims.

The hollow shaft is preferably fashioned as an output shaft. The component can thereby be used on the output side of a planetary gear train.

According to a preferred further development of the invention, the connecting element suitable for forming a shaft-hub connection is a keyway or gear teeth, in particular splines. The hollow-cast shaft can be fashioned both as a cylindrical shaft end with a keyway and in another shape with functional surfaces located externally, i.e. on the outer periphery of the shaft. A shaft-hub connection of the hollow shaft of the component with an external second shaft placed over the hollow shaft can be fashioned e.g. by means of a keyway or gear teeth fashioned on the outer periphery of the hollow shaft. The design of the chamber of the hollow shaft must be taken into account here in the dimensioning of the desired shaft-hub connection.

It is possible for the hollow shaft to be hollow-cylinder-shaped. It is also possible for the hollow shaft to have the shape of a truncated cone. In addition, it is possible for the opening to be circular. Furthermore, it is possible for the chamber to be cylindrical, in particular to have the shape of a circular cylinder. Alternatively, it is also possible for the chamber to have the shape of a truncated cone. The advantage here is that the shaft is rotationally symmetrical and consequently the component is easy to manufacture and install.

The inner sides of the hollow shaft, i.e. the walls delimiting the chamber, preferably remain unprocessed after the casting. Whereas in a conventional hollow shaft the inner sides of the hollow shaft have to perform a function, in particular to form, by means of a keyway fashioned on the inner side of the hollow shaft or a shrink ring mounted on the outer periphery of the hollow shaft, a shaft-hub connection with an external second shaft placed into the hollow shaft, and therefore have to be subjected to post-processing after the casting, in the present invention the inner sides have no function other than to improve the castability of the component. Due to the fact that the inner sides of the hollow shaft can remain completely unprocessed in the present invention, working time and therefore costs are saved.

It is possible for the chamber to have a constant internal diameter over its axial length. The advantage of this is that the manufacture, i.e. the casting, of the component is easy.

It is, however, also possible for the chamber to have a varying internal diameter over its axial length, e.g. in order to give the hollow shaft particular characteristics, in particular with regard to flexural and torsional rigidity. In particular, the chamber may taper in an axial direction.

According to a preferred embodiment of the invention, the wall thickness of the hollow shaft increases, preferably in a stepped manner, in the direction of the planetary carrier. It is possible here for the outer diameter of the hollow shaft to increase, preferably in a stepped manner, in the direction of the planetary carrier. In this way, the transition in wall thickness between shaft and cheek of the planetary carrier is executed gradually. Such a gradual transition in wall thickness reduces the susceptibility to faults in the transitional area between the shaft and the cheek of the planetary carrier.

According to an advantageous embodiment, the planetary carrier comprises a cheek, on which an axial end of the hollow shaft is arranged.

According to an advantageous embodiment, the planetary carrier comprises two parallel cheeks connected to one another by means of webs, an axial end of the hollow shaft being arranged on a side of one of the cheeks, said side facing away from the other cheek. The advantage of this geometrically clear and simple structure is that the component can be manufactured easily and planetary gears can be installed in the planetary carrier without problem. It is, however, also possible for the planetary carrier to have more than two cheeks, the hollow shaft being molded onto one of these cheeks.

According to an advantageous further development, the cheeks are each fashioned in the shape of a square plate with rounded corners, the cheeks have bearing seats for the arrangement of planetary gears between the two cheeks and the webs are arranged in the corner areas. The advantage of this geometrically clear and simple structure is that the component can be manufactured easily and planetary gears can be installed in the planetary carrier without problem. It is also possible for the cheeks to be fashioned in the shape of a triangular plate or generally in the shape of a polygon. In such cases, the number of bearing points arranged in the cheeks for planetary gear bearings may vary. It is e.g. possible for the number of bearing points to be three in the case of triangular cheeks, for the number of bearing points to be four in the case of square cheeks, and generally for the number of bearing points to be N in the case of N-cornered cheeks, where N is a natural number.

It is particularly advantageous for the cheeks each to be fashioned in the shape of a square plate with rounded corners, for the cheeks to have bearing seats for the arrangement of planetary gears between the two cheeks and for the webs to be arranged in the corner areas. The advantage of this geometrically clear, simple and compact structure is that the planetary carrier can be manufactured easily and planetary gears can be installed in the planetary carrier without problem.

According to an advantageous further embodiment, the chamber is accessible through an opening on a first axial end of the hollow shaft, said axial end facing away from the planetary carrier, and/or through an opening on an opposite second axial end of the hollow shaft, said axial end facing toward the planetary carrier.

The planetary carrier in the present invention is in particular a planetary carrier having an integrally cast hollow output journal for a cylindrical shaft end, having an externally located keyway or external splines.

A planetary gear train according to the invention comprises a component according to the invention or a component according to one of the further developments specified above.

According to an advantageous further development of a planetary gear train according to the invention, the hollow shaft forms an output journal of the planetary gear train. Alternatively, it is also possible for the hollow shaft to be a drive journal of the planetary gear train.

BRIEF DESCRIPTION OF THE DRAWING

The invention will be explained below, based on multiple exemplary embodiments, with the aid of the accompanying drawings, in which.

DETAILED DESCRIPTION OF PREFERRED EMBODIMENTS

Figure 1:
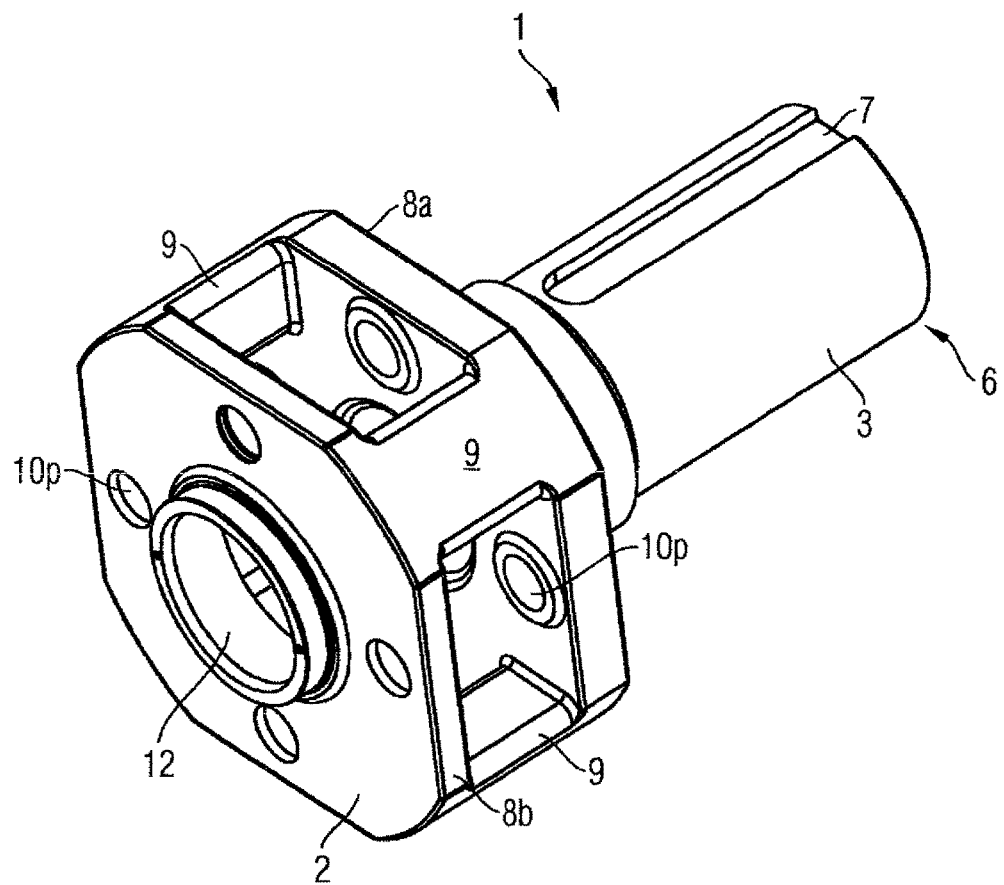
FIG. 1 shows a view of a component according to a first exemplary embodiment.
Figure 2:
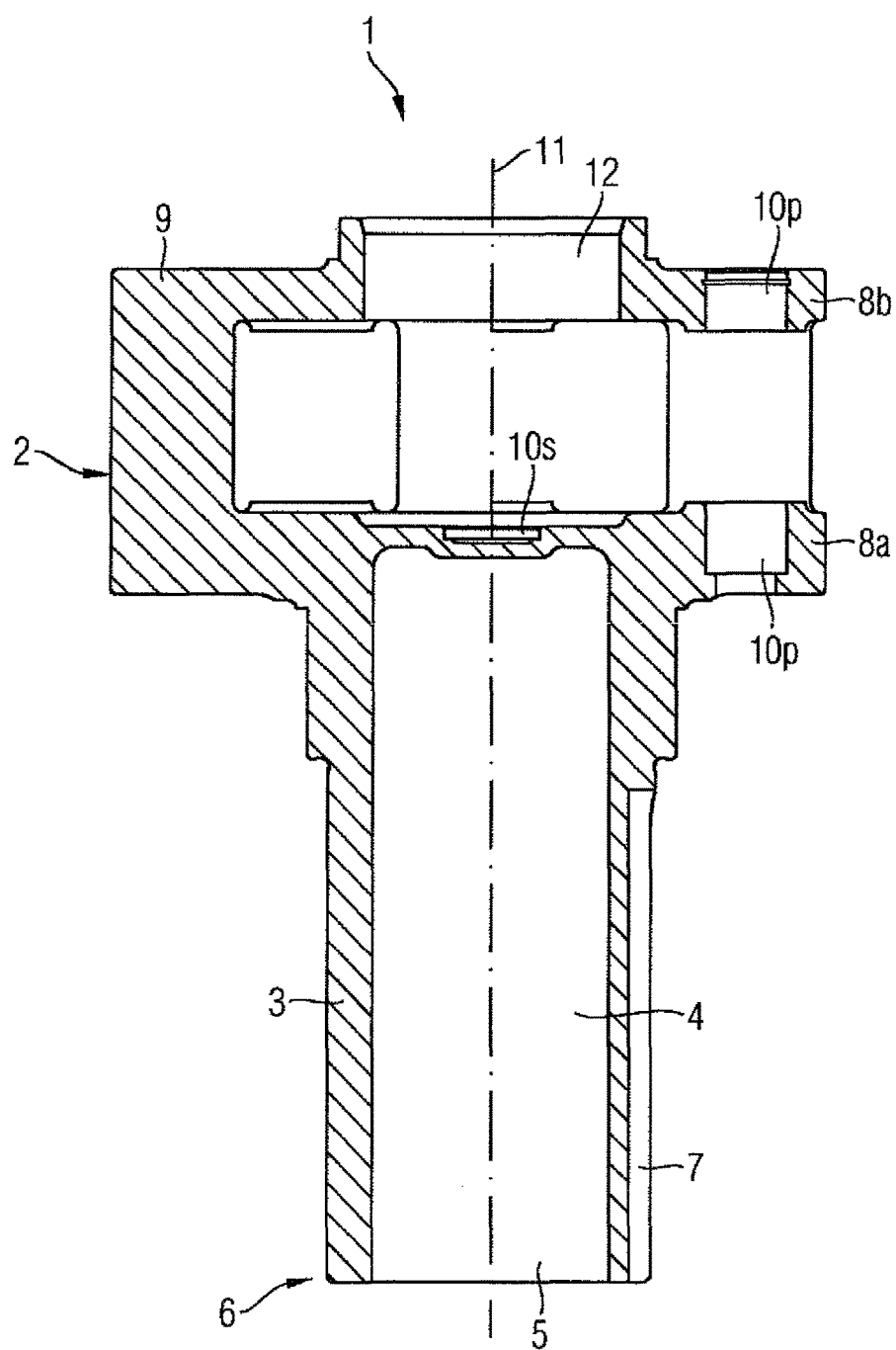
FIG. 2 shows a first section of the component from FIG. 1.

FIGS. 1 and 2 show a component 1, cast as one piece, for a planetary gear train, in an oblique view and in a section along its axis of rotation 11, respectively. The component 1 comprises a planetary carrier 2, consisting of two plate-shaped cheeks 8a and 8b, arranged parallel, which are connected to one another by means of four webs 9, which run perpendicular to the plate planes. The cheeks 8a and 8b each have the shape of a square with rounded corners, as is shown by the section, represented in FIG. 3, through the planetary carrier 2 perpendicular to the axis of rotation 11, looking toward a first cheek 8a. Here, each corner of the first cheek is connected by one of the webs 9 to a corresponding corner of the other cheek 8b such that a cage for accommodating four planetary gears is formed. Bearing seats 10p, fashioned as penetrations of the cheeks 8a and 8b, for bearing a planet axle are fashioned between each of the adjacent webs 9 in the opposing cheeks 8a and 8b.

The component 1 additionally comprises an output shaft 3 fashioned as a hollow shaft, in which a chamber 4, as shown in FIG. 2, was formed during the manufacture of the component 1 by means of a casting process. Here, the circular-cylinder-shaped chamber 4 has the same diameter over its entire axial length.

The chamber 4 is accessible through a circular opening 5 on an axial end 6 of the output shaft 3. The opposite end of the output shaft 3 is integrally connected to the first cheek 8a of the planetary carrier. The component 1 is fashioned such that the planetary carrier 2 forms a first axial end of the component 1 and the hollow shaft 3 forms a second axial end of the component 1 opposite to the first axial component end. Here, the chamber 4 inside the hollow shaft 3 is closed off by the first cheek 8a, which at this point has coaxially a bearing seat 10s for a bearing of a sun gear shaft. The axes of rotation 11 of the output shaft 3 and of the planetary carrier 2 coincide, i.e. the output shaft 3 and the planetary carrier 2 are arranged coaxially relative to one another. The cheek 8b facing away from the output shaft 3 has an axial penetration 12 for feeding through a sun gear shaft. The outer diameter of the hollow shaft 3 increases in a stepped manner in the direction of the planetary carrier 2; because of the constant inner diameter of the chamber 4, the wall thickness of the hollow shaft 3 increases in a stepped manner in the direction of the planetary carrier 2.

On the outer periphery of the output shaft 3, a keyway 7 is shaped over a defined axial length. In the present exemplary embodiment, the groove 7 starts at the open axial end 6 of the hollow shaft 3 and extends over approximately two-thirds of the shaft axis. This groove 7 serves to connect the output shaft 3 to a shaft of a work machine.

Figure 3:
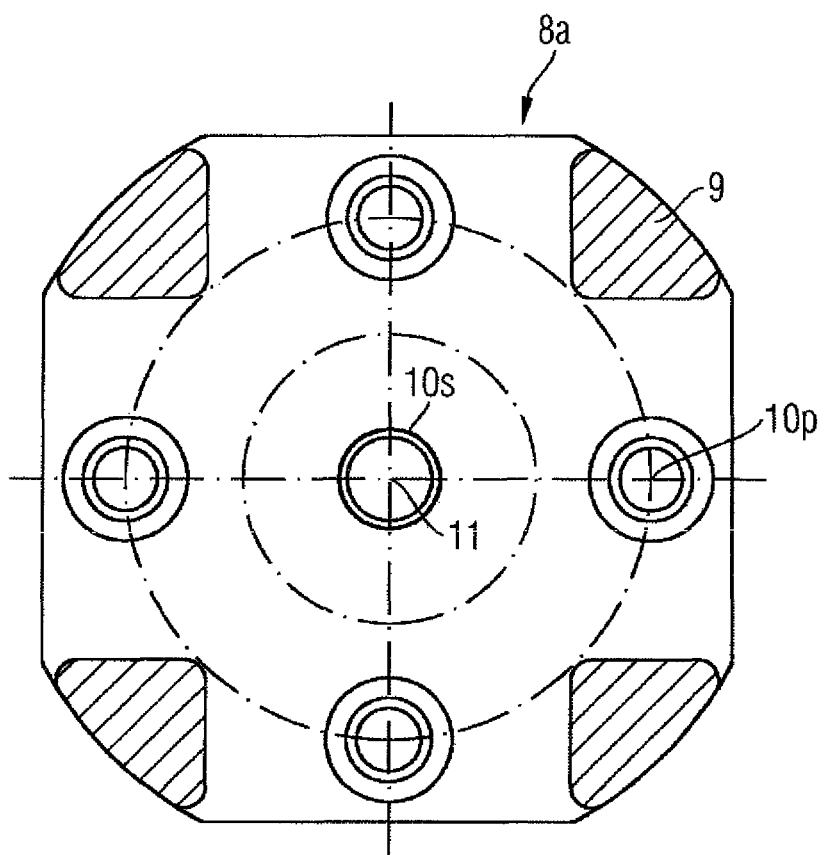
FIG. 3 shows a second section of the component from FIG. 1.
Figure 4:
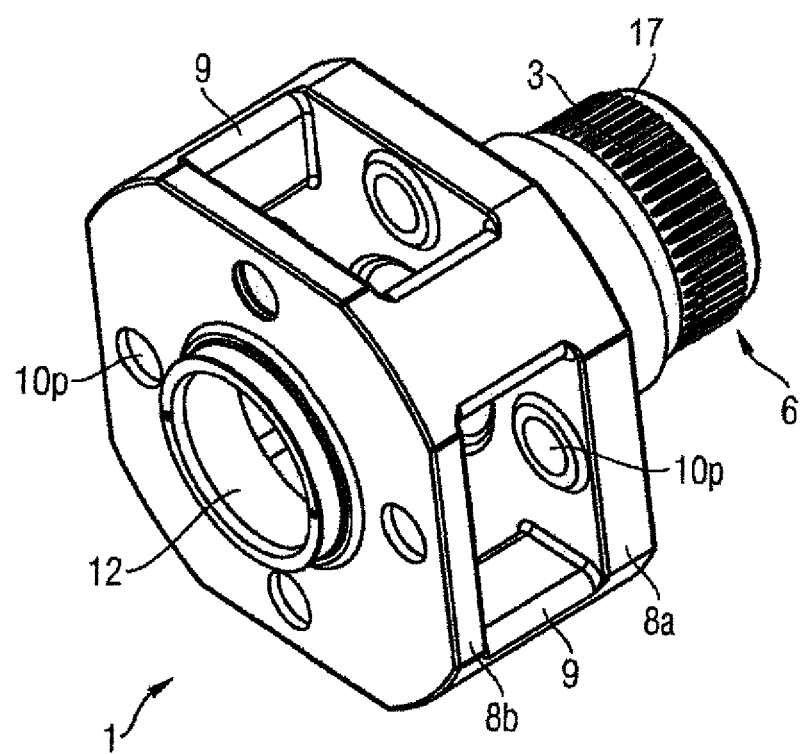
FIG. 4 shows a view of a component according to a further exemplary embodiment.
Figure 5:
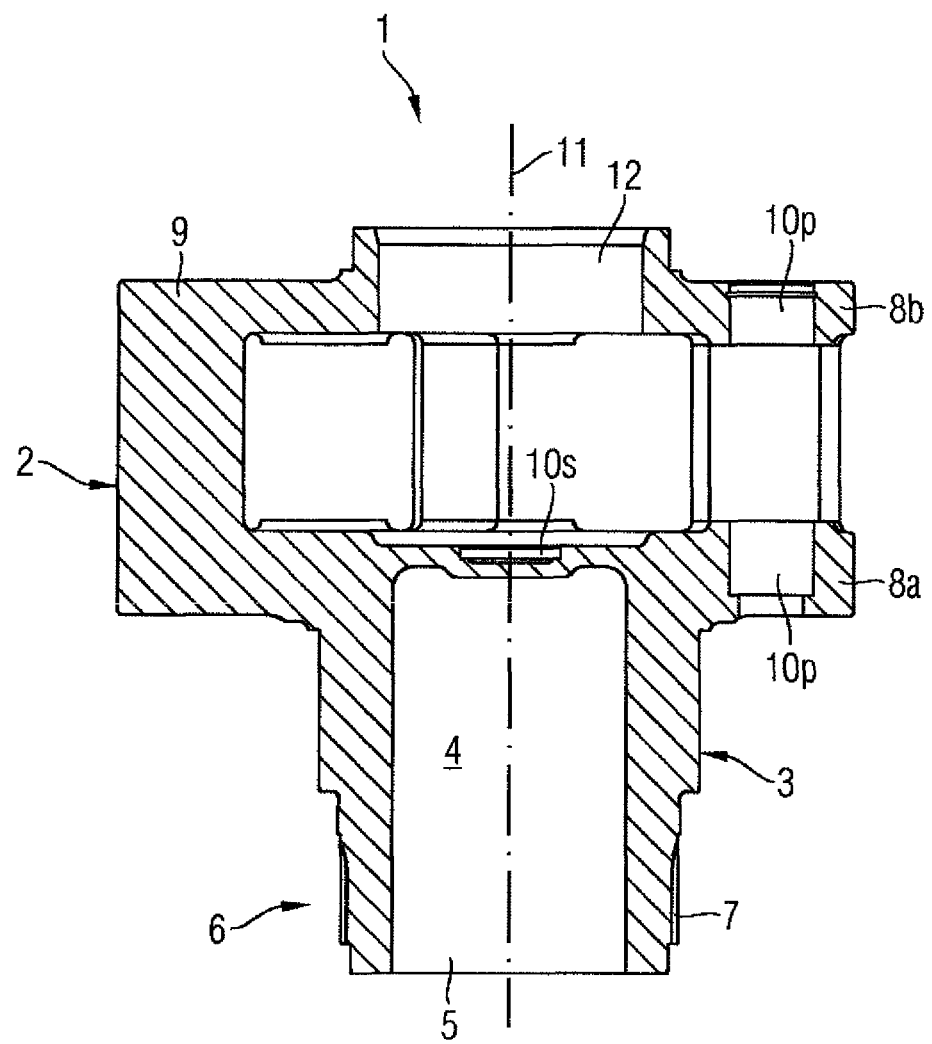
FIG. 5 shows a section of the component from FIG. 4.

FIGS. 4 and 5 show a component 1 according to a further exemplary embodiment, which is fashioned similarly to the first exemplary embodiment shown in FIGS. 1 to 3, apart from the connecting element 17: in contrast to the first exemplary embodiment, the connecting element 17 in the exemplary embodiment shown in FIGS. 4 and 5 is fashioned as splines arranged on the outer periphery of the hollow shaft 3. The axial length of the hollow shaft 3 is also significantly smaller than in the first exemplary embodiment.

Figure 6:
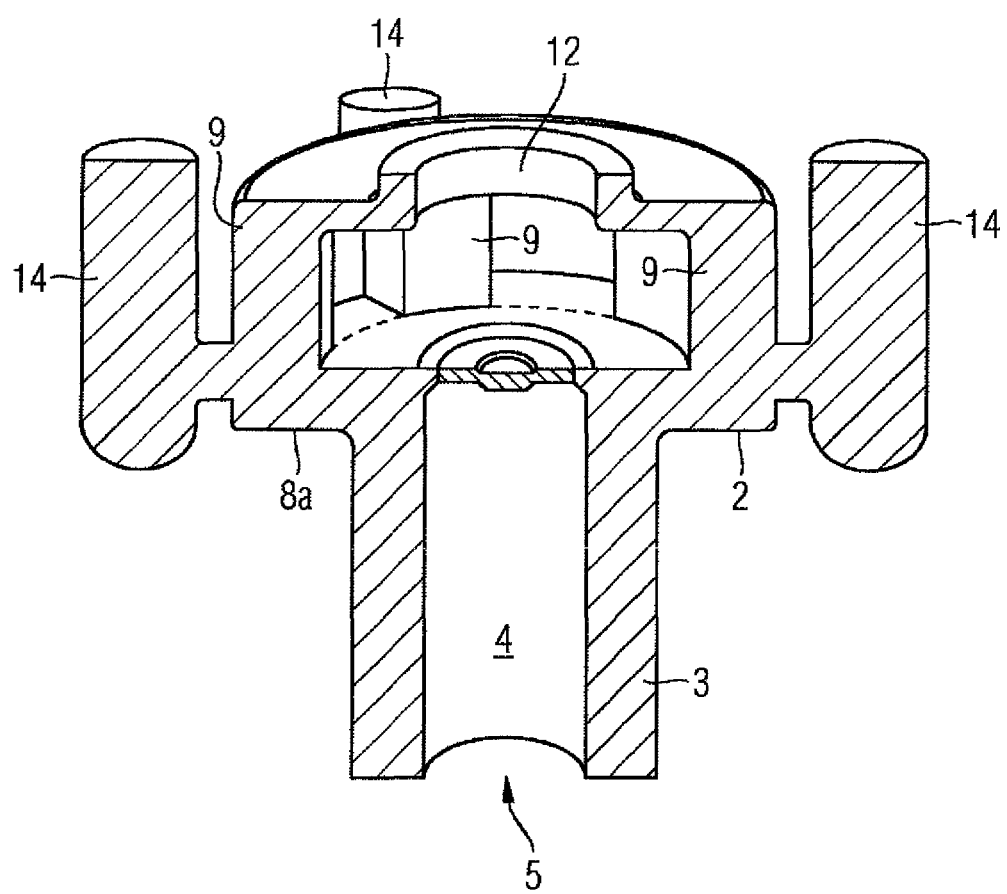
FIG. 6 shows a section of a cast model with attached feeders.

FIG. 6 shows a section of a cast model with attached feeders. The cast model is a component comprising a planetary carrier 2 and a hollow shaft 3 during manufacture in a casting process. The cast material is fed in via feeders 14 arranged laterally on the planetary carrier 2.

By casting with the shaft oriented downwards in the casting mold, it is possible to attach the feeders 14 laterally onto the cast part. In this way, the overall height in the casting mold e.g. in a casting box, is reduced.

Figure 7:
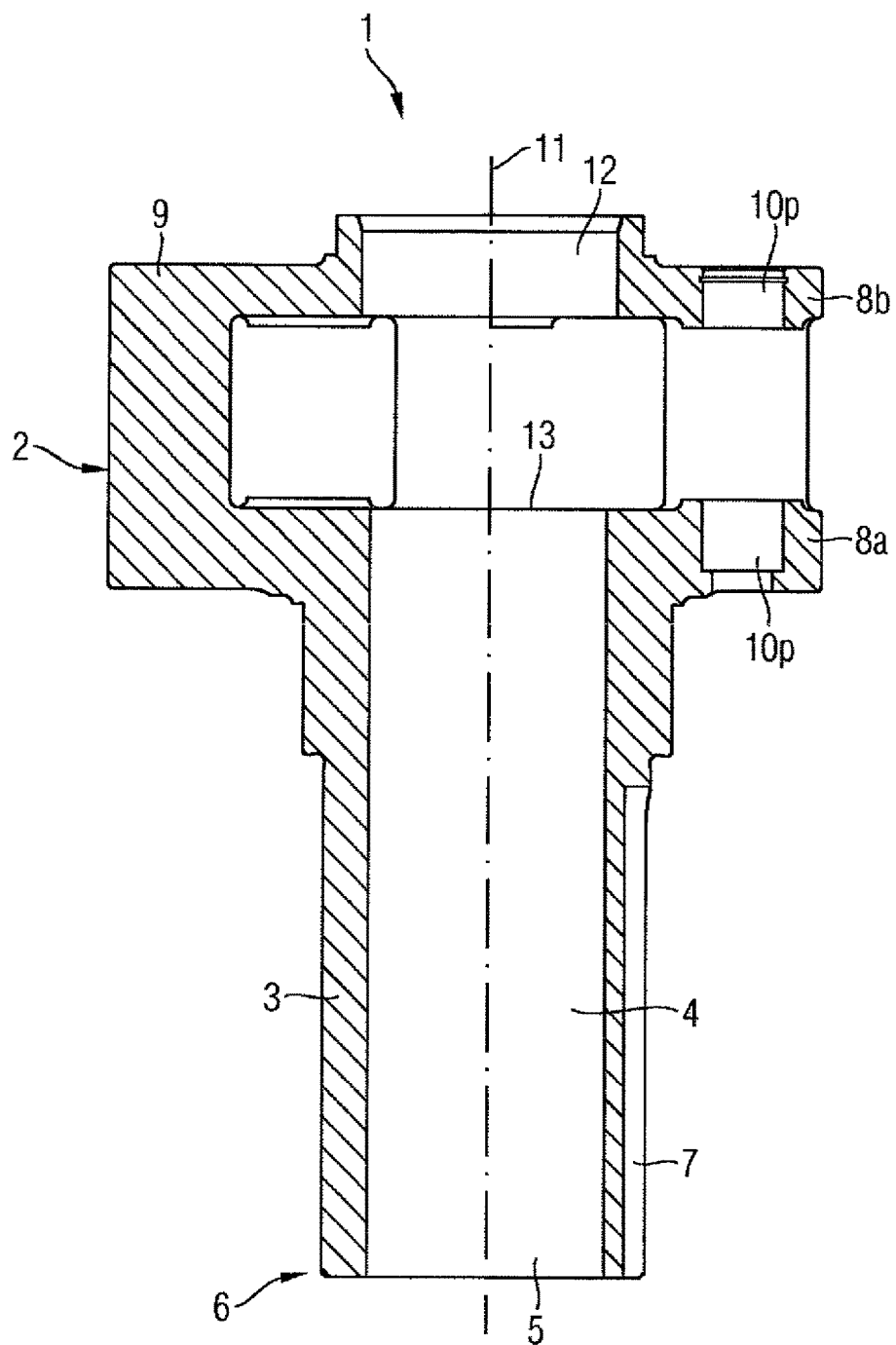
FIG. 7 shows a section of a component according to a further exemplary embodiment, in which the hollow shaft has an opening on each of its two axial ends.

FIG. 7 shows a section of a component 1 according to a further exemplary embodiment. Here, the hollow shaft 3 has an opening 5 and 13 on its two axial ends, respectively, through which openings the chamber 4 inside the hollow shaft 3 can be accessed. The chamber 4 can thus be accessed both through a first circular opening 5 on a first axial end 6 of the shaft 3 facing away from the planetary carrier 2 and through a second circular opening 13 on a second axial end of the shaft 3 facing toward the planetary carrier 2. In contrast to the first exemplary embodiment shown in FIGS. 1 to 3, in the exemplary embodiment shown in FIG. 7 there is consequently no partition wall closing off the chamber 4 at the axial end of the hollow shaft 3 facing toward the planetary carrier 2.

Figure 8:
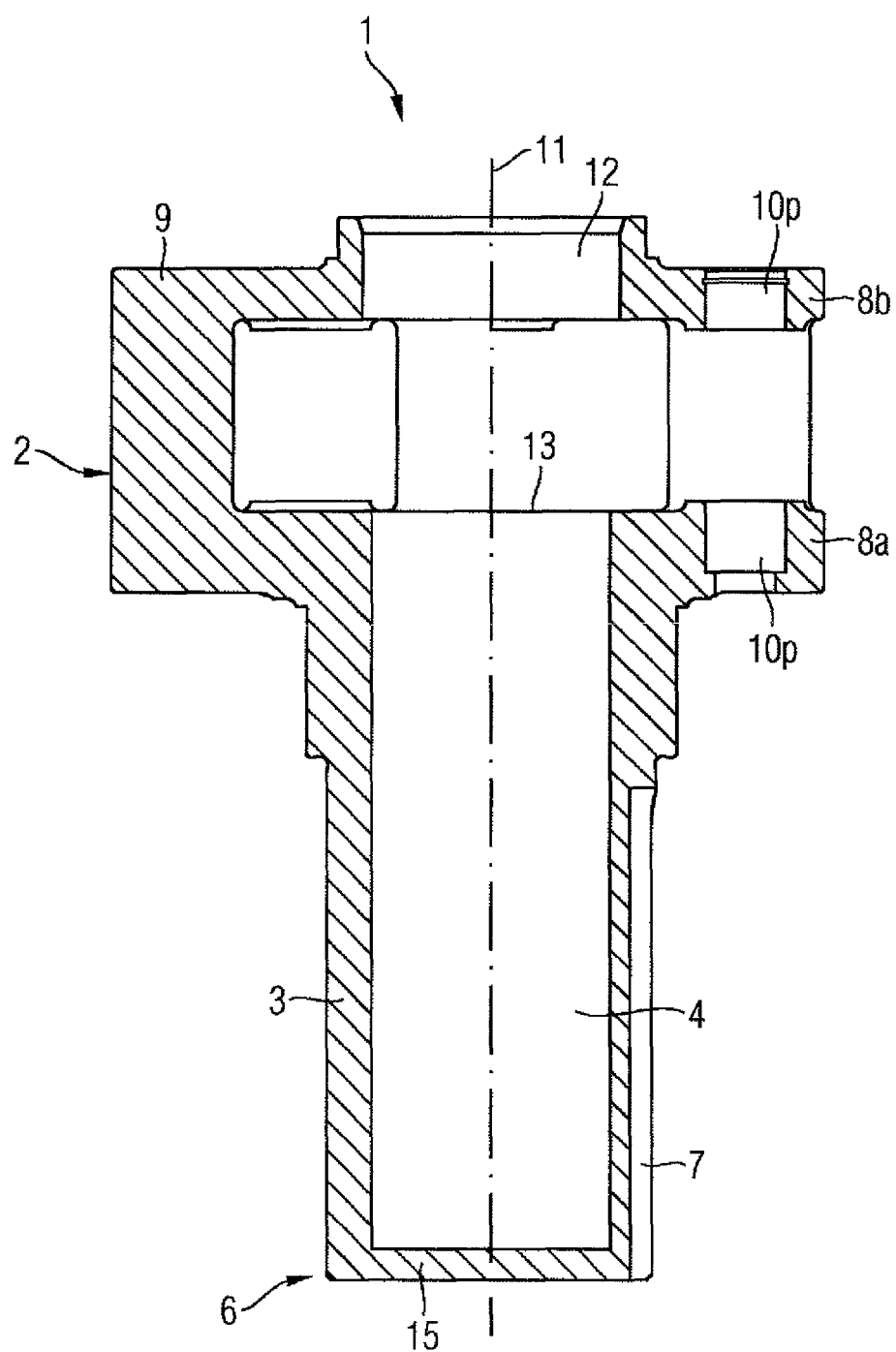
FIG. 8 shows a section of a component according to a further exemplary embodiment, in which the end face of the hollow shaft facing away from the planetary carrier is closed.

FIG. 8 shows a section of a component 1 according to a further exemplary embodiment, which is fashioned similarly to the exemplary embodiment shown in FIG. 7, apart from the axial end 6 of the shaft 3 facing away from the planetary carrier 2: in contrast to the exemplary embodiment from FIG. 7, in the exemplary embodiment shown in FIG. 8, an end wall 15 seals off the axial end 6 of the shaft 3 facing away from the planetary carrier 2.

The hollow shaft 3 consequently has on a first axial end of the shaft 3 facing toward the planetary carrier 2 an opening 13, through which the chamber 4 inside the hollow shaft 3 can be accessed. The shaft 3 molded onto a first cheek 8a of the planetary carrier 2 consequently has a chamber 4 open to the planetary carrier 2. By contrast, the second axial end 6 of the shaft 3 located opposite the first axial shaft end has the end wall 15, so the chamber 4 lying inside the hollow shaft 3 is closed off at this second axial end 6 from the surroundings of the shaft 3.

The wall thickness of the end wall 15 here is preferably less than or equal to the wall thickness of the cylinder sheath of the hollow shaft 3 adjoining the end wall 15. In this case, when the component 1 is cast, a defined, directional solidification of the liquid metal can occur, starting at the end wall 15 with its relatively small wall thickness via the continuously increasing wall thickness of the cylinder sheath in the direction of the relatively thick-walled cheek of the planetary carrier 2, from where the casting material enters.

Although the invention has been illustrated and described in detail by means of the preferred exemplary embodiments, the invention is not restricted by the disclosed examples, and other variations may be derived herefrom by a person skilled in the art without departing from the scope of protection of the invention.

The invention claimed is:

1. A component, which is cast as one piece, for a planetary gear train, said component comprising:
   a planetary carrier having a cheek shaped as a square plate with rounded corners;
   a hollow-cast hollow shaft arranged on the cheek in coaxial relation to the planetary carrier and having a chamber which is accessible through an opening on at least one axial end of the hollow shaft, said hollow shaft having cast cross-sections which are thinner than in the cheek of the planetary carrier adjoining the hollow shaft; and at least one connecting element supported on an outer periphery of the hollow shaft for forming a shaft-hub connection, wherein the at least one axial end of the hollow shaft faces toward the planetary carrier, wherein an end wall of the hollow shaft facing away from the planetary carrier is closed.

2. The component of claim 1, wherein the connecting element is a keyway or a gear teeth.

3. The component of claim 1, wherein the hollow shaft is hollow-cylinder-shaped or has the shape of a truncated cone.

4. The component of claim 1, wherein the opening is circular.

5. The component of claim 1, wherein the chamber is cylindrical.

6. The component of claim 1, wherein the chamber has a constant or varying inner diameter over its axial length.

7. The component of claim 1, wherein the hollow shaft has a wall thickness which increases in a direction of the planetary carrier.

8. The component of claim 1, wherein the hollow shaft has an outer diameter which increases in a direction of the planetary carrier.

9. The component of claim 1, wherein the planetary carrier includes a further cheek thereby resulting in two cheeks disposed in parallel relation and connected to one another by webs, said hollow shaft being arranged on a side of one of the cheeks, with said side facing away from the other one of the cheeks.

10. The component of claim 1, further comprising a second axial end opposite the at least one axial end, wherein the second axial end of the hollow shaft faces away from the planetary carrier.

11. A planetary gear train, comprising a component including a planetary carrier having a cheek shaped as a square plate with rounded corners, a hollow-cast hollow shaft comprised by the planetary gear train, said hollow-cast hollow shaft arranged on the cheek in coaxial relation to the planetary carrier and having a chamber which is accessible through an opening on at least one axial end of the hollow shaft, said hollow shaft having cast cross-sections which are thinner than in the cheek of the planetary carrier adjoining the hollow shaft, and at least one connecting element supported on an outer periphery of the hollow shaft for forming a shaft-hub connection, wherein the at least one axial end of the hollow shaft faces toward the planetary carrier, wherein an end wall of the hollow shaft facing away from the planetary carrier is closed.

12. The planetary gear train of claim 11, wherein the hollow shaft forms an output journal of the planetary gear train.

* * * * *